United States Patent
Ono et al.

(10) Patent No.: US 10,173,680 B2
(45) Date of Patent: Jan. 8, 2019

(54) VEHICLE SPEED CONTROL DEVICE

(71) Applicant: TOYOTA JIDOSHA KABUSHIKI KAISHA, Toyota-shi, Aichi-ken (JP)

(72) Inventors: Sayaka Ono, Susono (JP); Kazuaki Aso, Gotenba (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 45 days.

(21) Appl. No.: 15/265,264

(22) Filed: Sep. 14, 2016

(65) Prior Publication Data

US 2017/0080941 A1    Mar. 23, 2017

(30) Foreign Application Priority Data

Sep. 17, 2015    (JP) ................. 2015-183905

(51) Int. Cl.
*B60W 30/16*    (2012.01)
*B60W 30/14*    (2006.01)
*G01C 21/20*    (2006.01)

(52) U.S. Cl.
CPC ........ *B60W 30/162* (2013.01); *B60W 30/143* (2013.01); *G01C 21/20* (2013.01); *B60W 2520/10* (2013.01); *B60W 2520/105* (2013.01); *B60W 2540/20* (2013.01); *B60W 2550/302* (2013.01); *B60W 2550/306* (2013.01); *B60W 2550/308* (2013.01); *B60W 2550/402* (2013.01); *B60W 2600/00* (2013.01); *B60W 2720/12* (2013.01); *B60W 2720/125* (2013.01); *B60W 2750/308* (2013.01)

(58) Field of Classification Search
None
See application file for complete search history.

(56) References Cited

U.S. PATENT DOCUMENTS

| | | | |
|---|---|---|---|
| 9,738,280 B2* | 8/2017 | Rayes | B60W 30/143 |
| 2003/0135318 A1* | 7/2003 | Tellis | B60K 31/0008 |
| | | | 701/96 |
| 2003/0204299 A1* | 10/2003 | Waldis | B60K 31/0008 |
| | | | 701/96 |

(Continued)

FOREIGN PATENT DOCUMENTS

| | | |
|---|---|---|
| JP | 60-215432 A | 10/1985 |
| JP | 2000-339580 A | 12/2000 |
| JP | 2004-102536 A | 4/2004 |

*Primary Examiner* — Navid Ziaeianmehdizadeh
(74) *Attorney, Agent, or Firm* — Sughrue Mion, PLLC (57) ABSTRACT

A vehicle speed control device performs vehicle speed control for controlling the vehicle speed of a host vehicle so that the vehicle speed of the host vehicle becomes a preset vehicle speed that is set in advance when a preceding vehicle traveling ahead of the host vehicle is not detected and for controlling the vehicle speed of the host vehicle so that the host vehicle follows the preceding vehicle when the preceding vehicle is detected. The vehicle speed control device determines whether the host vehicle is positioned in an acceleration-control-inhibited area based on the position detected by a position detection unit and, when the preceding vehicle is not detected and a position determination unit determines that the host vehicle is positioned in the acceleration-control-inhibited area, the vehicle speed control device performs acceleration-control-inhibition vehicle speed control of the host vehicle.

4 Claims, 6 Drawing Sheets

(56) References Cited

U.S. PATENT DOCUMENTS

| | | | |
|---|---|---|---|
| 2005/0010351 A1* | 1/2005 | Wagner | B60K 31/0008 |
| | | | 701/96 |
| 2009/0157286 A1* | 6/2009 | Saito | B60W 30/12 |
| | | | 701/117 |
| 2010/0250088 A1* | 9/2010 | Grolle | B60W 10/06 |
| | | | 701/96 |
| 2015/0100216 A1* | 4/2015 | Rayes | B60W 30/143 |
| | | | 701/96 |
| 2015/0203126 A1* | 7/2015 | Kobana | B60W 50/12 |
| | | | 701/93 |
| 2018/0126989 A1* | 5/2018 | Krabot | B60W 30/143 |

\* cited by examiner

VEHICLE SPEED CONTROL DEVICE

INCORPORATION BY REFERENCE

The disclosure of Japanese Patent Application No. 2015-183905 filed on Sep. 17, 2015 including the specification, drawings and abstract is incorporated herein by reference in its entirety.

BACKGROUND OF THE INVENTION

1. Field of the Invention

The present invention relates to a vehicle speed control device of a vehicle.

2. Description of Related Art

As a device for controlling the vehicle speed of a vehicle, the device described in Japanese Patent Application Publication No. 60-215432 (JP 60-215432 A) is known. This device controls the vehicle speed in such a way that, when there is no preceding vehicle, the host vehicle travels with vehicle speed set to a preset speed and that, when there is a preceding vehicle, the host vehicle follows the preceding vehicle with a predetermined inter-vehicle distance.

The device described above has the following problem. When a preceding vehicle disappears from the road ahead while the host vehicle is controlling the vehicle speed by following the preceding vehicle that is traveling at a speed lower than the preset vehicle speed, there is a possibility that the driver of the host vehicle driver has a feeling of strangeness because the host vehicle performs an unnecessary acceleration control. For example, assume that the host vehicle is performing vehicle speed control by following a preceding vehicle on a limited-access road. In this case, if only the host vehicle enters an exit lane to exit from the limited-access road, the host vehicle may be accelerated to the preset speed because the preceding vehicle has disappeared from the road ahead. In the exit lane to an open road where the legal speed limit is low, the driver has a feeling of strangeness about an unnecessary acceleration.

Therefore, in this technical field, the development of a vehicle speed control device is desired that avoids a host vehicle's unnecessary acceleration in order to reduce the possibility that a driver has a feeling of strangeness.

SUMMARY OF THE INVENTION

One aspect of a vehicle speed control device of the present invention is a vehicle speed control device that performs vehicle speed control for controlling a vehicle speed of a host vehicle so that the vehicle speed of the host vehicle becomes a preset vehicle speed that is set in advance when a preceding vehicle traveling ahead of the host vehicle is not detected and for controlling the vehicle speed of the host vehicle so that the host vehicle follows the preceding vehicle when the preceding vehicle is detected. This vehicle speed control device is configured by including a map storage unit that stores an acceleration-control-inhibited area that is set on a map in advance, a position detection unit that detects a position of the host vehicle on the map, a position determination unit that determines whether the host vehicle is positioned in the acceleration-control-inhibited area based on the position detected by the position detection unit, and a vehicle speed control unit that performs acceleration-control-inhibition vehicle speed control of the host vehicle when the preceding vehicle is not detected and when the position determination unit determines that the host vehicle is positioned in the acceleration-control-inhibited area.

According to this vehicle speed control device, vehicle speed control is performed without performing the acceleration control of the host vehicle in an acceleration-control-inhibited area that is set on the map in advance for an exit lane of a limited-access road or for an entrance lane to a rest area. Therefore, when the host vehicle, which follows a preceding vehicle traveling at a speed lower than the preset speed, enters an exit lane of a limited-access road and, as a result, the preceding vehicle is not detected anymore, this vehicle speed control device can avoid an unnecessary acceleration control in the exit lane, thus reducing the possibility that a driver has a feeling of strangeness about the unnecessary acceleration.

The vehicle speed control device may further include an entrance determination unit and an information unit, wherein the map storage unit stores an exit-lane branching section of a limited-access road and an exit lane, which branches off the exit-lane branching section of the limited-access road, as the acceleration-control-inhibited area, the entrance determination unit determines whether the host vehicle has moved from the exit-lane branching section of the limited-access road to the exit lane based on a host vehicle position on the map detected by the position detection unit, the information unit informs a driver of the host vehicle that the acceleration-control-inhibition vehicle speed control of the host vehicle is being performed when the entrance determination unit determines that the host vehicle has moved from the exit-lane branching section of the limited-access road to the exit lane, and the information unit does not inform the driver of the host vehicle that the acceleration-control-inhibition vehicle speed control of the host vehicle is being performed when the entrance determination unit does not determine that the host vehicle has moved from the exit-lane branching section of the limited-access road to the exit lane. In this case, by including the exit-lane branching section of a limited-access road into the acceleration-control-inhibited area, an unnecessary acceleration control can be avoided before the host vehicle enters an exit lane. That is, when the host vehicle, which follows a preceding vehicle traveling at a speed lower than the preset vehicle speed, changes the traveling direction immediately before entering the exit lane, the host vehicle does not detect the preceding vehicle anymore. In this case, the exit-lane branching section is set as a part of the acceleration-control-inhibited area, the setting allows the host vehicle to avoid an unnecessary acceleration control before entering the exit lane. In addition, the host vehicle, which has entered an exit-lane branching section of a limited-access road, may travel straight ahead in the limited-access road without entering the exit lane and pass through the exit-lane branching section. When the information, which indicates that acceleration-control-inhibition vehicle speed control of the host vehicle is being performed, is output to the driver each time the host vehicle travels straight ahead in the limited-access road and passes through an exit-lane branching section, there is a possibility that the driver feels that the information is cumbersome. To address this problem, the information is not output when the host vehicle has entered the exit-lane branching section of a limited-access road but when it is not determined that the host vehicle has moved from the exit-lane branching section to the exit lane. This information method reduces the possibility that the driver feels that the information is cumbersome. In addition, when it is determined that the host vehicle has moved from the exit-lane branching section to the exit lane, the information is output to indicate that the acceleration-control-inhibition vehicle speed control of the host vehicle is being performed.

This information reduces the possibility that the driver has a feeling of strangeness about the traveling of the host vehicle even if the host vehicle, which has entered the exit lane and the preceding vehicle is not detected anymore, is not accelerated.

According to the vehicle speed control device, the preceding vehicle may be a vehicle that travels ahead of the host vehicle in the same lane in which the host vehicle travels.

The vehicle speed control device may have a function to perform acceleration control according to a blinker operation as vehicle speed control of the host vehicle.

The vehicle speed control device may further include a vehicle speed determination unit, wherein the vehicle speed determination unit determines whether a host vehicle speed is lower than the preset vehicle speed when it is determined that the preceding vehicle is not detected, the position determination unit determines whether the host vehicle is positioned in the acceleration-control-inhibited area when it is determined that the host vehicle speed is lower than the preset vehicle speed, and the vehicle speed control unit that performs acceleration-control-inhibition vehicle speed control of the host vehicle when it is determined that the host vehicle speed is not lower than the preset vehicle speed.

According to the present invention, the vehicle speed control device can avoid an unnecessary acceleration of the host vehicle to reduce the possibility that a driver has a feeling of strangeness.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the present invention are described in detail below with reference to the drawings. In the description below, the same reference numeral is used for the same or equivalent component and the duplicated description is omitted.

(First Embodiment)

Figure 1:
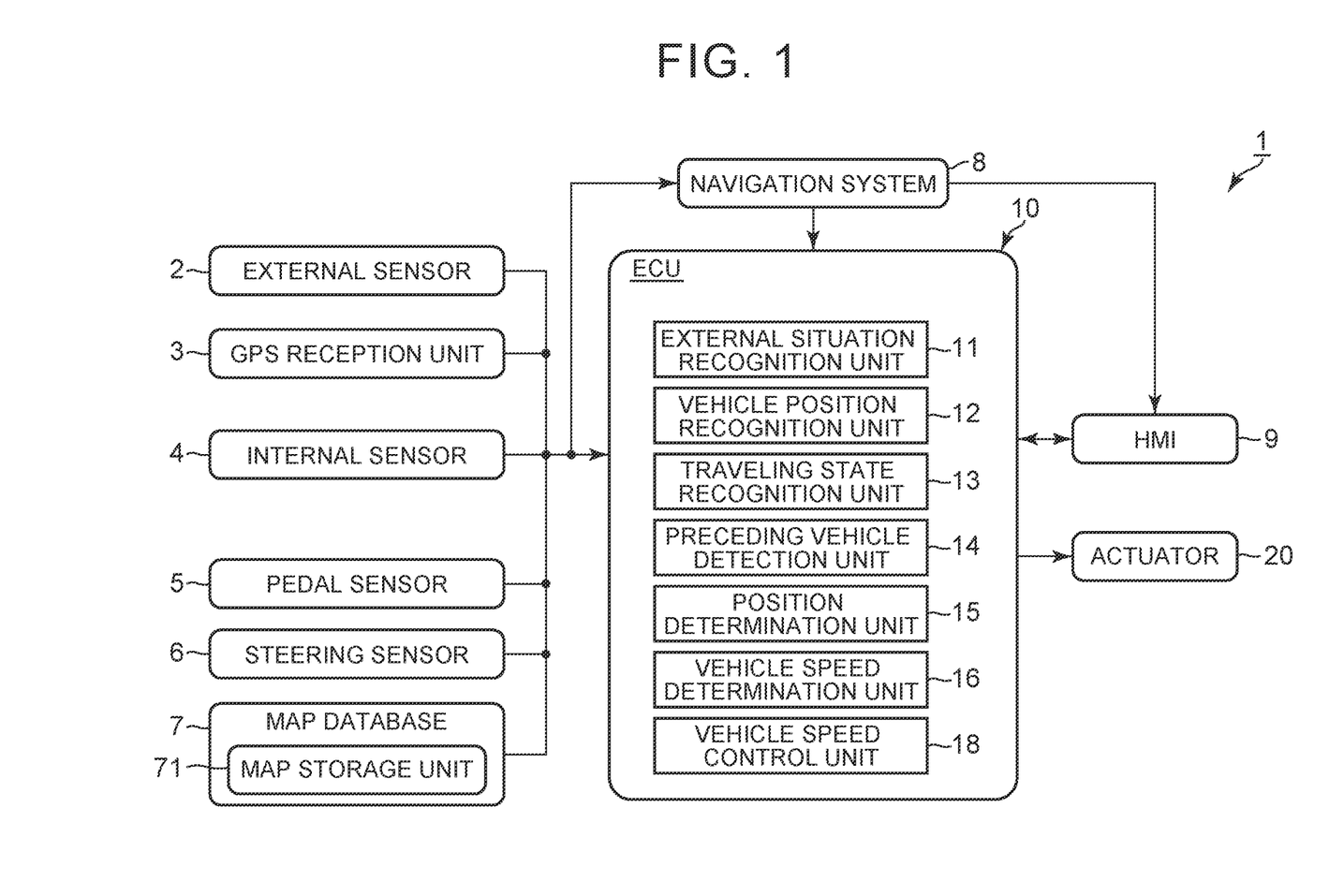
FIG. 1 is a block diagram showing the outline of a configuration of a vehicle speed control device in a first embodiment of the present invention.

FIG. 1 is a diagram showing the outline of a configuration of a vehicle speed control device 1 in a first embodiment of the present invention. In FIG. 1, the vehicle speed control device 1 in this embodiment is a device mounted on a host vehicle for performing the vehicle speed control of the host vehicle. That is, the vehicle speed control device 1 controls the vehicle speed of the host vehicle in such a way that, when a preceding vehicle traveling ahead of the host vehicle is not detected, the vehicle speed of the host vehicle is set equal to a preset vehicle speed that is set in advance and, when a preceding vehicle is detected, the host vehicle follows the preceding vehicle.

The vehicle speed control device 1 includes an electronic control unit (ECU) 10. The ECU 10, an electronic control unit for performing the traveling control of the vehicle, is configured as a computer that includes a central processing unit (CPU), a read only memory (ROM), and a random access memory (RAM). The ECU 10 will be described in detail later.

To the ECU 10, an external sensor 2, a global positioning system (GPS) reception unit 3, an internal sensor 4, a pedal sensor 5, a steering sensor 6, a map database 7, a navigation system 8, a human machine interface (HMI) 9, and an actuator 20 are connected.

The external sensor 2 is a detection apparatus for detecting the external situation that is the surrounding information on the host vehicle. The external sensor 2 is used to detect a preceding vehicle that travels ahead of the host vehicle. The external sensor 2 includes at least one of a camera, a radar, and a Laser Imaging Detection and Ranging (LIDAR).

The camera is a capturing apparatus that captures the external situation of the host vehicle. The camera is provided, for example, on the interior side of the windshield of the host vehicle. The camera may be a monocular camera or a stereo camera. The stereo camera includes two capturing units arranged so that the disparity between the right eye and the left eye can be reproduced. The information captured by the stereo camera also includes the depth-direction information. When a stereo camera is used, the camera may be used as a preceding vehicle detection unit for detecting a preceding vehicle. In addition, the camera may be used as a sensor that detects the white lines of the lane in which the host vehicle is traveling. The camera may be a camera that captures the area ahead of the host vehicle or may be a rear camera that captures the area behind the host vehicle.

The radar detects an object, such as an obstacle or a preceding vehicle outside the host vehicle, using a radio wave (for example, millimeter wave). The radar detects an obstacle by sending a radio wave to the surroundings of the host vehicle and receiving a radio wave reflected by the obstacle. The radar sends the detected object information to the ECU 10.

The LIDAR detects an object, such as an obstacle or a preceding vehicle outside the host vehicle, using light. The LIDAR measures the distance to a reflection point and detects an obstacle by sending light to the surroundings of the host vehicle and receiving light reflected by the obstacle. The LIDAR sends the detected object information to the ECU 10. Two or more of the camera, LIDAR, and radar need not necessarily be installed.

The GPS reception unit 3 receives signals from three or more GPS satellites to measure the position of the host vehicle (for example, the longitude and latitude of the host vehicle). The GPS reception unit 3 outputs the measured position information on the host vehicle to the ECU 10. It should be noted that, instead of the GPS reception unit 3, another unit that can identify the longitude and latitude of the host vehicle may be used. The function to measure the direction of the host vehicle, if available, is desirable for use in comparison between the measured result of the sensor and the map information that will be described later.

The internal sensor 4 is a detection apparatus that detects the traveling state of the host vehicle. The internal sensor 4 includes a vehicle speed sensor, an acceleration sensor, and a yaw rate sensor as sensors for detecting the traveling state of the host vehicle. The vehicle speed sensor is a detection apparatus that detects the speed of the host vehicle. An example of the vehicle speed sensor is a wheel speed sensor that is provided on the wheels of the host vehicle or on the drive shaft that rotates together with, or in synchronization with, the wheels to detect the rotation speed of the wheels. The vehicle speed sensor outputs the detected vehicle speed information (wheel speed information) to the ECU 10. The acceleration sensor is a detection apparatus that detects the acceleration of the host vehicle. For example, the acceleration sensor includes a longitudinal acceleration sensor that detects acceleration in the longitudinal direction of the host vehicle and a lateral acceleration sensor that detects acceleration in the lateral direction of the host vehicle. The acceleration sensor outputs the acceleration information on the host vehicle to the ECU 10. The yaw sensor is a detection apparatus that detects the yaw rate (turning angle velocity) around the vertical axis at the center of gravity of the host vehicle. For example, a gyro sensor may be used as the yaw rate censor. The yaw rate sensor outputs the detected yaw rate information on the host vehicle to the ECU 10. In some cases, the acceleration sensor and the yaw rate sensor are not provided.

The pedal sensor 5 is a sensor that detects a pedal operation performed by the driver. As the pedal sensor 5, an accelerator pedal sensor, a brake pedal sensor, and a clutch pedal sensor are used. The pedal sensor 5 detects the operation amount of a pedal operation performed by the driver and outputs the pedal operation signal to the ECU 10.

The steering sensor 6 is a sensor that detects a steering operation performed by the driver. As the steering sensor 6, a steering angle sensor or a steering torque sensor is used. The steering sensor 6 detects the operation amount of a steering operation performed by the driver and outputs the steering operation signal to the ECU 10.

The map database 7 is a database that stores map information. For example, the map database 7 is formed in a hard disk drive (HDD) installed on the vehicle. The map information includes position information on the roads, road shape information (number of lanes, type of lane etc.), and position information on intersections and junctions. The map database 7 includes a map storage unit 71. The map storage unit 71 stores information on acceleration-control-inhibited areas that are set on the map in advance. An acceleration-control-inhibited area refers to a vehicle traveling road area where the acceleration control of the host vehicle is inhibited if the host vehicle, traveling under control of the vehicle speed control, is not following a preceding vehicle. Examples of an acceleration-control-inhibited area include an exit lane that branches off the main lane of an expressway and an entrance lane to a rest area or a parking area. An area, where acceleration control of the host vehicle is not appropriate, may also be set as an acceleration-control-inhibited area. The map database 7 may also be stored in a computer in facilities, such as an information processing center, that can communicate with the host vehicle.

The navigation system 8 is a device that guides the host vehicle driver to the destination that is set by the host vehicle driver. The navigation system 8 calculates a route, on which the host vehicle will travel, based on the position information on the host vehicle measured by the GPS reception unit 3 and the map information stored in the map database 7. The route may be a lane suitably identified in a multiple-lane area. The navigation system 8 calculates a target route from the vehicle position to the destination and informs the driver about the target route through a display on the display or a voice output from the speaker. The navigation system 8 outputs the information on the target route of the host vehicle to the ECU 10. The navigation system 8 may also be stored in a computer in facilities, such as an information processing center, that can communicate with the host vehicle.

The HMI 9 is an interface for outputting and inputting information between the occupants (including the driver) of the host vehicle and the vehicle speed control device 1. The HMI 9 has a monitor or a display panel for displaying image information to the occupants, a speaker for outputting voices, and operation buttons or a touch panel for allowing the occupants to perform input operations. The HMI 9 may include a vibrator that vibrates the steering wheel or the driver's seat. The HMI 9 includes an operation switch of the vehicle speed control device 1 and an inter-vehicle selector switch for use when following a preceding vehicle. The operation switch is a switch for switching the ON/OFF state of the operation of the vehicle speed control device 1. The inter-vehicle selector switch is a switch for switching the inter-vehicle distance to the preceding vehicle or the inter-vehicle time. The HMI 9 may use a wirelessly connected mobile information terminal to output information to the occupants or may receive an input operation from an occupant using a mobile information terminal.

The actuator 20 is a device that performs the vehicle speed control of the host vehicle. The actuator 20 includes at least a driving actuator and a brake actuator. The driving actuator controls the amount of air to be supplied to the engine (throttle angle) according to the control signal from the ECU 10, thereby controlling the driving force of the host vehicle. When the host vehicle is a hybrid vehicle or an electric vehicle, the control signal is input from the ECU 10 to the motor, which is the source of power, to control the driving force. As the driving actuator, an engine ECU, a hybrid ECU, or a motor driving ECU is used. The brake actuator controls the brake system according to the control signal from the ECU 10 to control the braking force to be applied to the wheels of the host vehicle. For example, a hydraulic brake system is used as the brake system. For example, a brake ECU is used as the control actuator.

The ECU 10 includes an external situation recognition unit 11, a vehicle position recognition unit 12, a traveling state recognition unit 13, a preceding vehicle detection unit 14, a position determination unit 15, a vehicle speed determination unit 16, and a vehicle speed control unit 18.

The external situation recognition unit 11 recognizes the external situation of the host vehicle based on the detection result of the external sensor 2 (for example, information captured by the camera, object information detected by the radar, object information detected by the LIDAR, etc.). The external situation includes the situation such as the road width, road shape, situation of other vehicles around the host vehicle, and the situation of obstacles around the host vehicle.

The vehicle position recognition unit 12 recognizes the host vehicle position on the map based on the host vehicle position information received by the GPS reception unit 3 and the map information stored in the map database 7. The vehicle position recognition unit 12 may recognize whether the host vehicle has passed across a white line based on the information captured by the rear camera of the external sensor 2. The vehicle position recognition unit 12 may also recognize a white line using the image information, captured by the camera of the external sensor 2, to recognize the vehicle position in relation to the lane. This vehicle position recognition unit 12 functions as a position detection unit that detects the host vehicle position on the map.

The traveling state recognition unit 13 recognizes the traveling state of the host vehicle based on the detection result of the internal sensor 4 (vehicle speed information detected by the vehicle speed sensor, acceleration information detected by the acceleration sensor, yaw rate information detected by the yaw rate sensor, etc.). The vehicle traveling state includes the vehicle speed, acceleration, and yaw rate. That is, the traveling state recognition unit 13 functions as a vehicle speed detection unit that detects the vehicle speed of the vehicle. The traveling state recognition unit 13 may recognize the traveling direction of the vehicle based on a temporal change in the vehicle position.

The preceding vehicle detection unit 14 detects a preceding vehicle that travels ahead of the host vehicle. For example, the preceding vehicle detection unit 14 detects a preceding vehicle immediately ahead of the host vehicle based on the detection result of the external sensor 2 (for example, information captured by the camera, object information detected by the radar, object information detected by the LIDAR, etc.). The preceding vehicle, which refers to a vehicle traveling ahead of the host vehicle in the same lane, does not include vehicles traveling ahead in an adjacent lane or other lanes. The preceding vehicle detection unit 14 determines whether a preceding vehicle is detected based on the preceding vehicle detection result. The preceding vehicle detection unit 14 may be configured as a part of the external situation recognition unit 11.

The position determination unit 15 determines whether the host vehicle is positioned in an acceleration-control-inhibited area. For example, the position determination unit 15 determines whether the host vehicle is positioned in an acceleration-control-inhibited area based on the host vehicle position detected by the vehicle position recognition unit 12. More specifically, during vehicle speed control, the position determination unit 15 determines that the host vehicle is positioned in an acceleration-control-inhibited area if the host vehicle traveling position is in an acceleration-control-inhibited area stored in the map storage unit 71 and that the host vehicle is not positioned in an acceleration-control-inhibited area if the host vehicle traveling position is not in an acceleration-control-inhibited area.

The vehicle speed determination unit 16 determines whether the vehicle speed of the host vehicle is lower than the preset vehicle speed. The preset vehicle speed, which is a vehicle speed that is set in the ECU 10 in advance, is the target vehicle speed of the host vehicle at which the host vehicle travels when there is no preceding vehicle during vehicle speed control. The vehicle speed determination unit 16 determines whether the host vehicle speed, detected by the traveling state recognition unit 13, is lower than the preset speed.

The vehicle speed control unit 18 performs the vehicle speed control of the host vehicle. That is, the vehicle speed control unit 18 controls the vehicle speed of the host vehicle in such a way that the host vehicle travels at the preset vehicle speed when a preceding vehicle traveling ahead of the host vehicle is not detected and that the host vehicle follows a preceding vehicle when the preceding vehicle is detected. For example, the vehicle speed control unit 18 calculates the target acceleration according to the control content, outputs the control signal corresponding to the target acceleration to the actuator 20, and controls the vehicle speed by the operation of the actuator 20. The target acceleration includes a negative acceleration, that is, a deceleration.

The vehicle speed control unit 18 performs acceleration-control-inhibition vehicle speed control (acceleration inhibited control) of the host vehicle when a preceding vehicle is not detected and when the host vehicle is positioned in an acceleration-control-inhibited area. Acceleration control mentioned here refers to control for accelerating the host vehicle to the preset vehicle speed when a preceding vehicle is not detected. Acceleration-control-inhibition vehicle speed control refers, for example, to vehicle speed control for maintaining the current vehicle speed of the host vehicle. Acceleration-control-inhibition vehicle speed control may include vehicle speed control for decelerating the host vehicle. When performing acceleration-control-inhibition vehicle speed control, the target acceleration is zero or a negative value.

The external situation recognition unit 11, vehicle position recognition unit 12, traveling state recognition unit 13, preceding vehicle detection unit 14, position determination unit 15, vehicle speed determination unit 16, and vehicle speed control unit 18 may be configured by installing software or a program that implements respective function in the ECU 10. The programs may be configured, in part or in whole, by electronic control units.

Next, the operation of the vehicle speed control device 1 in this embodiment is described.

Figure 2:
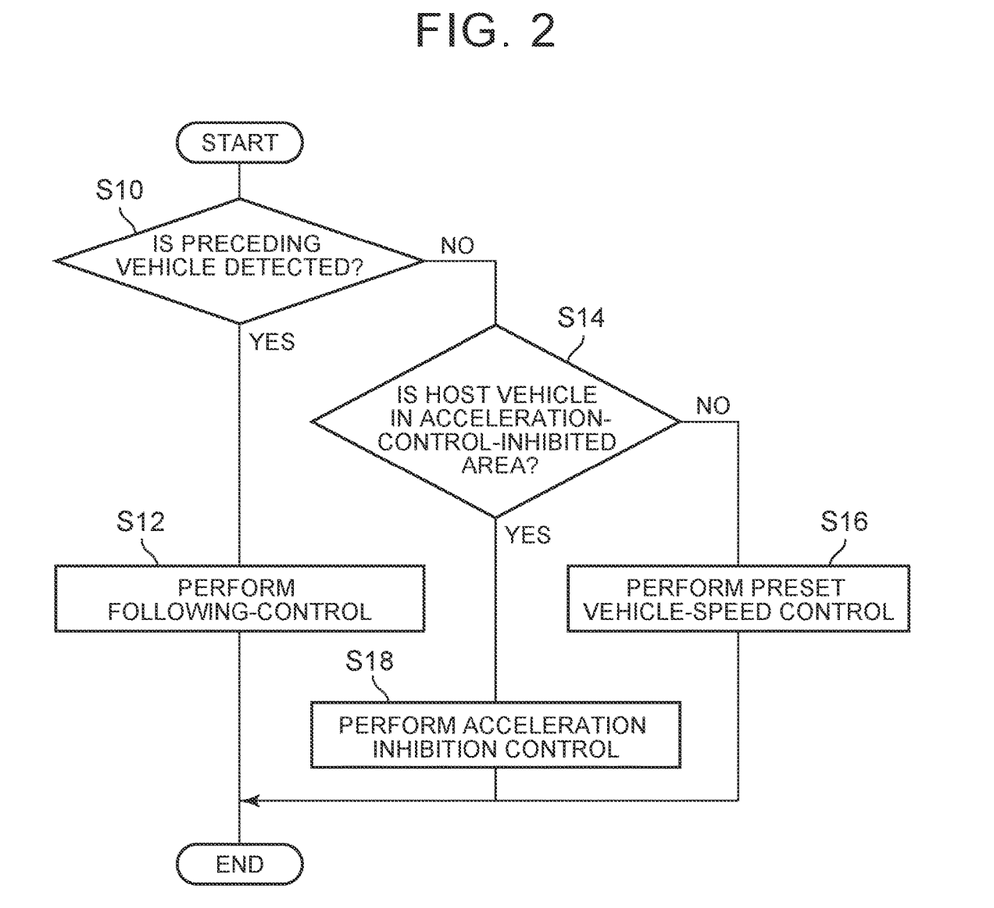
FIG. 2 is a flowchart showing the vehicle speed control processing of the vehicle speed control device shown in FIG. 1.

FIG. 2 is a flowchart showing the vehicle speed control processing performed by the vehicle speed control device 1 in this embodiment. The control processing shown in FIG. 2 is performed by the ECU 10 when the operation switch of the vehicle speed control device 1 is turned on. First, as shown in step S10 (hereinafter, step S10 is simply denoted as "S10". This notation is used for the other steps indicated by the letter "S"), it is determined whether a preceding vehicle traveling ahead of the host vehicle is detected. That is, the preceding vehicle detection unit 14 detects a preceding vehicle based on the information detected by the external sensor 2 and, based on the detection result of a preceding vehicle, determines whether a preceding vehicle is detected.

If it is determined in S10 that a preceding vehicle is detected, the following-control processing is performed (S12). The following-control processing refers to the processing for controlling the vehicle speed of the host vehicle so that the host vehicle follows the preceding vehicle. For example, the vehicle speed control unit 18 calculates the target acceleration of the host vehicle so that the inter-vehicle distance between the host vehicle and the preceding vehicle becomes a distance that is set in advance, and outputs the control signal, corresponding to the target acceleration, to the actuator 20. This control signal causes the actuator 20 to operate to control the vehicle speed of the host vehicle so that the host vehicle follows the preceding vehicle.

On the other hand, if it is determined in S10 that a preceding vehicle is not detected, it is determined whether the host vehicle is positioned in an acceleration-control-inhibited area (S14). For example, the position determination unit 15 determines whether the host vehicle is positioned in an acceleration-control-inhibited area based on the host vehicle position on the map detected by the vehicle position recognition unit 12. That is, the position determination unit 15 determines that the host vehicle is positioned in an acceleration-control-inhibited area if the traveling position of the host vehicle is included in an acceleration-control-inhibited area stored in the map storage unit 71. On the other hand, the position determination unit 15 determines that the host vehicle is not positioned in an acceleration-control-inhibited area if the traveling position of the host vehicle is not included in an acceleration-control-inhibited area.

If it is determined in S14 that the host vehicle is not positioned in an acceleration-control-inhibited area, the preset vehicle-speed control processing is performed (S16). The preset vehicle-speed control processing refers to the processing for controlling the vehicle speed so that the host vehicle travels at a preset vehicle speed that is set in advance. For example, the vehicle speed control unit 18 calculates the target acceleration of the host vehicle so that the host vehicle travels at the preset vehicle speed and outputs the control signal, corresponding to the calculated target acceleration, to the actuator 20. If deceleration is required for the host vehicle in this case, the target acceleration is calculated as a negative acceleration. The control signal, which is output to the actuator 20, causes the actuator 20 to start operation to control the vehicle speed of the host vehicle so that the host vehicle travels at the preset vehicle speed.

On the other hand, if it is determined in S14 that the host vehicle is positioned in an acceleration-control-inhibited area, the acceleration inhibition control processing is performed (S18). The acceleration inhibition control processing refers to the acceleration-control-inhibition vehicle speed control of the host vehicle. For example, the vehicle speed control unit 18 performs vehicle speed control for maintaining the current vehicle speed of the host vehicle. More specifically, the vehicle speed control unit 18 calculates the target acceleration of the host vehicle so that the current vehicle speed of the host vehicle is maintained and then outputs the control signal, corresponding to the calculated target acceleration, to the actuator 20. This control signal causes the actuator 20 to operate to perform vehicle speed control so that the host vehicle maintains the current vehicle speed. In addition, the acceleration-control-inhibition vehicle speed control of the host vehicle may be the vehicle speed control for decelerating the host vehicle or may be the vehicle speed control for setting the upper limit value of the target acceleration to zero. The vehicle speed control for decelerating the host vehicle is performed in such a way that the target acceleration of the host vehicle is calculated so that the current vehicle speed of the host vehicle is decelerated and, then, the control signal, corresponding to the calculated target acceleration, is output to the actuator 20. The vehicle speed control for setting the upper limit value of the target acceleration to zero is performed in such a way that the target acceleration of the host vehicle is calculated with its upper limit value as zero and, then, the control signal, corresponding to the calculated target acceleration, is output to the actuator 20. In addition, the acceleration-control-inhibition vehicle speed control may be any other type of vehicle speed control as long as acceleration control is not performed. After the processing in S12, S16, or S18 is finished, the vehicle speed control processing in FIG. 2 is terminated. After that, the control processing is repeated again beginning in S10.

In the vehicle speed control processing shown in FIG. 2, control processing may be added or omitted unless the addition or the omission affects the control result. For example, if it is determined in S10 that a preceding vehicle is not detected, it may be determined whether the host vehicle speed is lower than the preset vehicle speed. That is, the vehicle speed determination unit 16 may be used to compare the vehicle speed of the host vehicle (that is, host vehicle speed) and the preset vehicle speed that is set in advance for determining whether the host vehicle speed is lower than the preset vehicle speed that is set in advance. In this case, if it is determined that the host vehicle speed is lower than the preset vehicle speed, the processing proceeds to S14 to determine whether the host vehicle is positioned in an acceleration-control-inhibited area. On the other hand, if it is determined that the host vehicle speed is not lower than the preset vehicle speed, the processing proceeds to S16 to perform the preset-vehicle-speed control processing.

Figure 3:
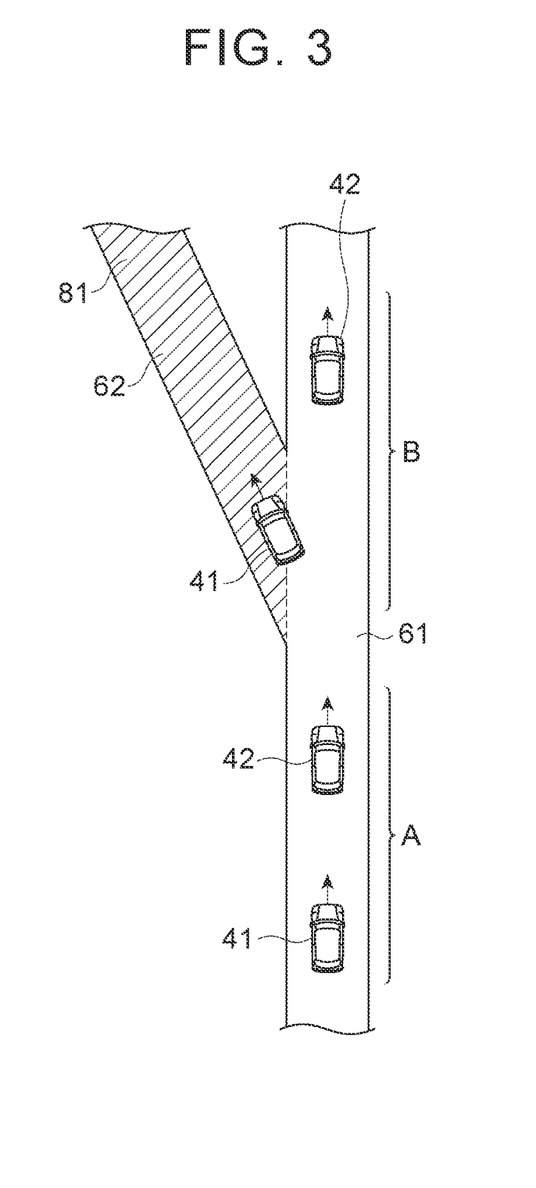
FIG. 3 is a diagram showing vehicle speed control in an expressway performed by the vehicle speed control device shown in FIG. 1.

FIG. 3 is a diagram showing an example of vehicle speed control performed by the vehicle speed control device 1 in this embodiment.

In scene A, a host vehicle 41 is traveling behind a preceding vehicle 42 in a main lane 61 of an expressway as shown in FIG. 3. Therefore, the vehicle speed control device 1 (not shown in FIG. 3) mounted on the host vehicle 41 performs the vehicle speed control processing in which the host vehicle 41 follows the preceding vehicle 42. In this expressway, an exit lane 62 that branches off the main lane 61 is an acceleration-control-inhibited area 81. That is, the exit lane 62 is set as the acceleration-control-inhibited area 81 in the vehicle speed control device 1.

When the scene changes to scene B and only the host vehicle 41 exits from the main lane 61 to the exit lane 62, the preceding vehicle 42 disappears from the road ahead of the host vehicle 41. At this time, even if the host vehicle 41 is traveling at a vehicle speed lower than the preset vehicle speed, the acceleration control is not performed. The reason is that, because the exit lane 62 is the acceleration-control-inhibited area 81, the vehicle speed control device 1 performs the acceleration-control-inhibition control as the vehicle speed control for the host vehicle 41. For example, the vehicle speed control device 1 performs the vehicle speed control so that the host vehicle 41 maintains the current vehicle speed. That is, the host vehicle 41 continues traveling while maintaining the current vehicle speed. This vehicle speed control can prevent the host vehicle 41 from accelerating in the acceleration-control-inhibited area 81 where acceleration control is not necessary, thus reducing the possibility that the driver has a feeling of strangeness about the traveling of the host vehicle 41.

As described above, the vehicle speed control device 1 in this embodiment performs acceleration-control-inhibition vehicle speed control of the host vehicle 41 if, during the vehicle speed control of the host vehicle 41, the preceding vehicle 42 is not detected and if the host vehicle 41 is positioned in the acceleration-control-inhibited area 81. This ability avoids an unnecessary acceleration traveling of the host vehicle 41 and reduces the possibility that the driver has a feeling of strangeness due to the unnecessary acceleration.

For example, if the host vehicle 41 is accelerated in a situation in which the host vehicle 41 wants to decelerate, for example, in an exit lane from an expressway or in an entrance lane to a parking area, the driver has a feeling of strangeness. To address this problem, the vehicle speed control device 1 in this embodiment sets an area, such as an exit lane from an expressway or an entrance lane to a parking area, as the acceleration-control-inhibited area 81 to inhibit the acceleration control of the host vehicle 41 in that acceleration-control-inhibited area 81. Inhibiting the acceleration control in this manner reduces the possibility that the driver has a feeling of strangeness caused by an unnecessary acceleration.

This embodiment describes an example in which the host vehicle enters an exit lane while performing vehicle speed control by following a preceding vehicle on an expressway.

However, it should be noted that an unnecessary acceleration control can also be prevented in other cases. For example, the vehicle speed control device 1 in this embodiment can be applied also when the host vehicle enters, not an exit lane, but an entrance lane to a parking area or a rest area. In this case, too, the vehicle speed control device 1 sets the entrance lane to a parking area or a rest area as an acceleration-control-inhibited area, thereby avoiding an unnecessary acceleration control in this entrance lane.

In addition, when the host vehicle, which is traveling on an expressway in the manual driving mode alone, switches the driving mode from the manual mode to the vehicle-speed-control based driving mode with the use of the resume function and then enters an exit lane, the vehicle speed control device 1 in this embodiment can avoid an unnecessary acceleration control in the exit lane.

In addition, the vehicle speed control device 1 in this embodiment can reduce the possibility of an unnecessary acceleration control when the blinker-operation-based acceleration control function is provided as the vehicle speed control of the host vehicle. For example, when the host vehicle performs the blinker operation when moving from the main lane of an expressway to an exit lane, the vehicle speed control device 1 performs the acceleration-control-inhibition vehicle speed control of the host vehicle to disable the blinker-operation-based vehicle speed control. This makes it possible to avoid an unnecessary acceleration control.

(Second Embodiment) Next, a vehicle speed control device 1a in a second embodiment of the present invention is described.

Figure 4:
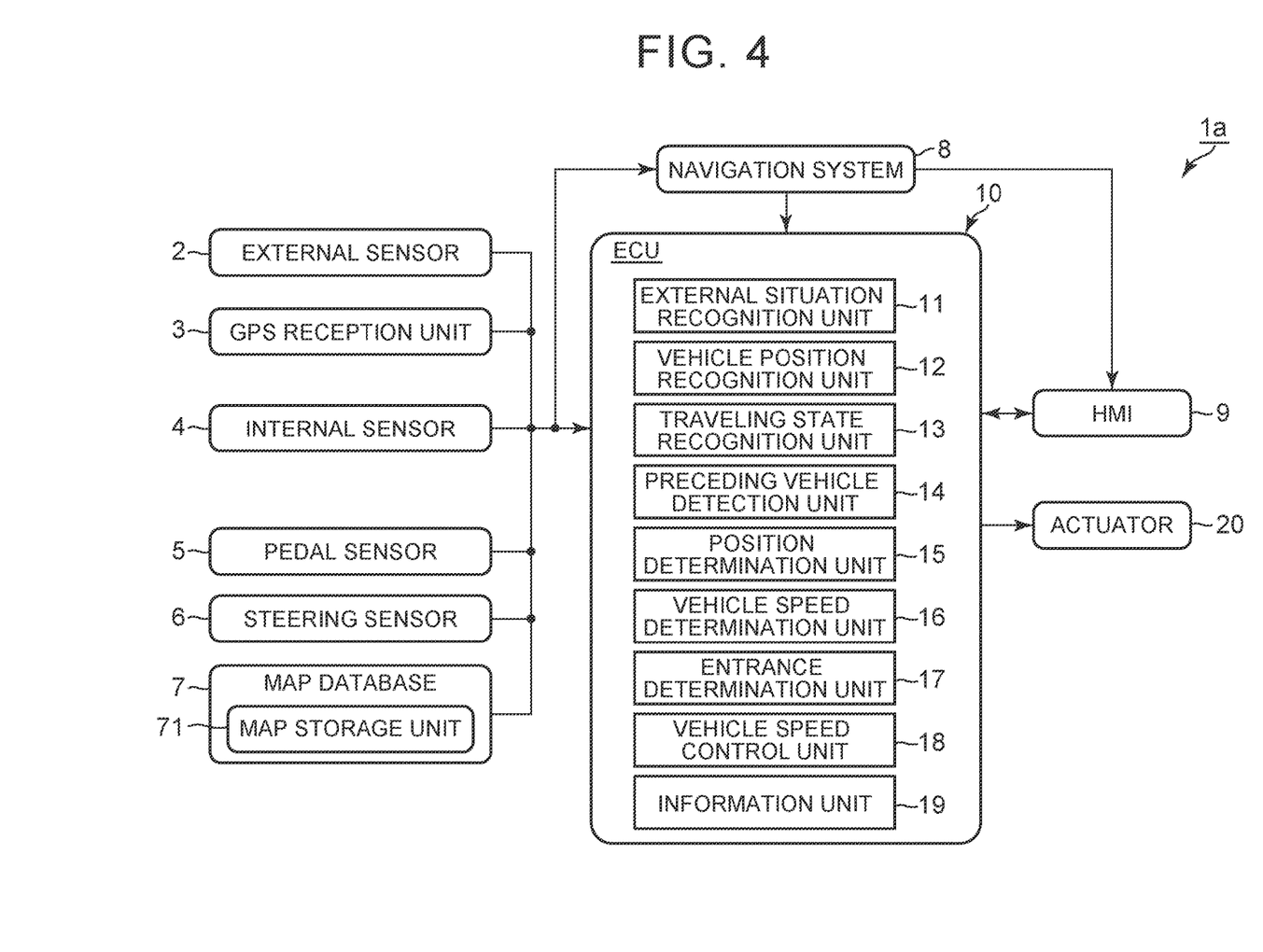
FIG. 4 is a block diagram showing the outline of a configuration of a vehicle speed control device in a second embodiment of the present invention.

FIG. 4 is a diagram showing the outline of a configuration of the vehicle speed control device 1a in this embodiment.

The vehicle speed control device 1a in this embodiment is configured almost similarly to the vehicle speed control device 1 in the first embodiment described above except that the ECU 10 includes an entrance determination unit 17 and an information unit 19 and that the map storage unit 71 stores the information on exit-lane branching sections of a limited-access road as acceleration-control-inhibited areas.

The vehicle speed control device 1a is similar to the vehicle speed control device 1 in the first embodiment in that an exit lane of a limited-access road is set as an acceleration-control-inhibited area and in that acceleration-control-inhibition vehicle speed control is performed in an acceleration-control-inhibited area. The vehicle speed control device 1a sets an exit-lane branching section of a limited-access road as an acceleration-control-inhibited area too. A limited-access road, a road only for vehicle traffic, is a road such as an expressway. An exit-lane branching section is a road area that is a part of a limited-access road and is connected to an exit lane. An exit-lane branching section will be described in detail later. An exit lane is a road area for exiting from a limited-access road to a road other than a limited-access road. For example, an exit lane is an area from the main lane of a limited-access road to a road other than a limited-access road or an area from the main lane of a limited-access road to a tollbooth. The vehicle speed control device 1a performs acceleration-control-inhibition vehicle speed control also in an exit-lane branching section and, when the host vehicle moves from an exit-lane branching section to an exit lane without following a preceding vehicle, informs the driver of the host vehicle that the acceleration-control-inhibition vehicle speed control is being performed.

In FIG. 4, the map storage unit 71 stores the exit-lane branching sections and the exit lanes of a limited-access road as acceleration-control-inhibited areas. The map storage unit 71 may also store other areas, which are neither exit-lane branching sections nor exit lanes and where acceleration control is not required, as acceleration-control-inhibited areas.

The entrance determination unit 17 determines whether the host vehicle has moved from an exit-lane branching section of a limited-access road to an exit lane based on the host vehicle position detected by the vehicle position recognition unit 12. For example, while traveling in the main lane of a limited-access road such as an expressway, the host vehicle enters an exit-lane branching section provided in the main lane adjacent to an exit lane. At this time, if the host vehicle travels straight ahead in the main lane and passes through the exit-lane branching section, the entrance determination unit 17 does not determine that the host vehicle has moved from the exit-lane branching section of the limited-access road to the exit lane. On the other hand, if the host vehicle has moved from the main lane toward the exit lane and has entered the exit lane, the entrance determination unit 17 determines that the host vehicle has moved from the exit-lane branching section of the limited-access road to the exit lane. Whether the host vehicle has entered the exit lane may be determined by determining whether the position of the center of gravity of the host vehicle has entered the exit lane. Whether the host vehicle has entered the exit lane may also be determined by determining whether the trailing edge of the host vehicle, that is, the whole of the host vehicle, has entered the exit lane. For example, if the rear of the host vehicle is captured by the rear camera and, in the captured image, the boundary between the main lane and the exit lane is detected, it may be determined that the host vehicle has entered the exit lane.

The entrance determination unit 17, included in the ECU 10, may be configured by installing software or a program, which implements the function of the entrance determination unit 17, into the ECU 10 or may be configured as a piece of hardware such as an individual electronic control unit.

The information unit 19 informs the driver of the host vehicle that the acceleration-control-inhibition vehicle speed control of the host vehicle is being performed if, during the vehicle speed control, the preceding vehicle detection unit 14 does not detect the preceding vehicle 42 and if the entrance determination unit 17 determines that the host vehicle has moved from an exit-lane branching section of a limited-access road to an exit lane. The information unit 19 sends the control signal to the HMI 9 to inform the driver. For example, the information unit 19 informs the driver by operating a display, a monitor, an indicator, or a lamp that visually informs the driver, by operating a speaker or a buzzer that acoustically informs the driver, or by operating a vibrator that tactilly informs the driver. The information unit 19 does not inform the driver if the preceding vehicle detection unit 14 detects the preceding vehicle 42 or if the entrance determination unit 17 does not determine that the host vehicle has moved from an exit-lane branching section of a limited-access road to an exit lane. The information unit 19, included in the ECU 10, may be configured by installing software or a program, which implements the function of the information unit 19, into the ECU 10 or may be configured as a piece of hardware such as an individual electronic control unit that is independent of the other components in the ECU 10.

Next, the operation of the vehicle speed control device 1a in this embodiment is described below.

The vehicle speed control of the vehicle speed control device 1a in this embodiment is performed almost similarly to the vehicle speed control of the vehicle speed control device 1 in the first embodiment. The vehicle speed control in this embodiment is performed according to the flowchart of the vehicle speed control processing of the vehicle speed control device 1 in the first embodiment shown in FIG. 2. However, it should be noted that the vehicle speed control device 1a performs the acceleration-control-inhibition vehicle speed control not only in an exit lane, but also in an exit-lane branching section, of an expressway. The control content of the acceleration-control-inhibition vehicle speed control is the same as that described in the first embodiment.

Figure 5:
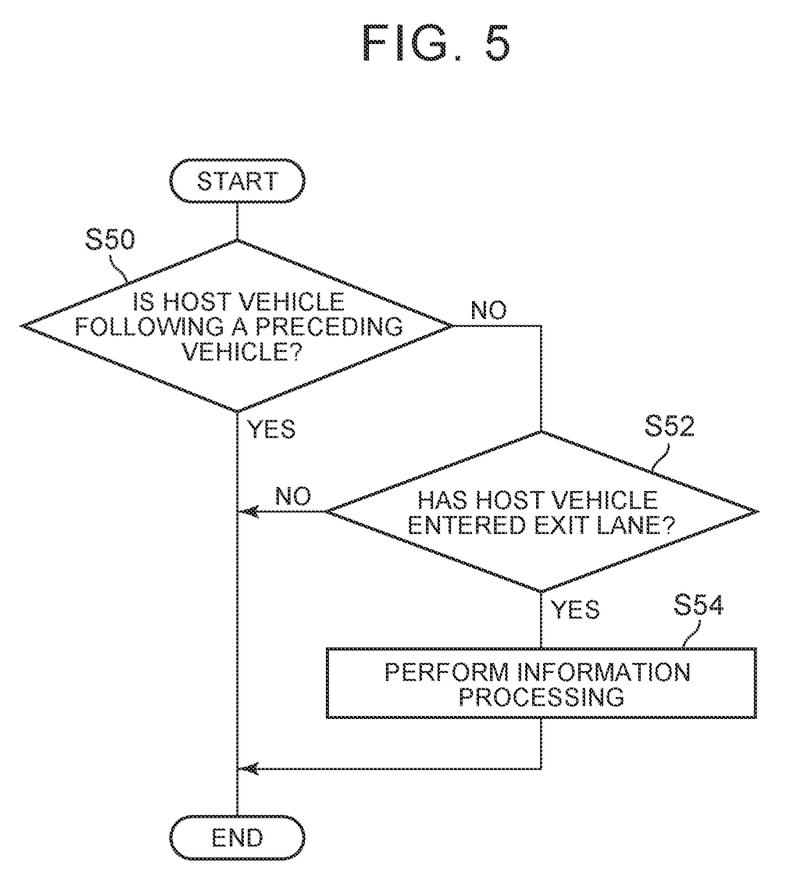
FIG. 5 is a flowchart showing the information processing of the vehicle speed control device shown in FIG. 4.

FIG. 5 is a flowchart showing the information processing of the vehicle speed control device 1a in this embodiment. The information processing shown in FIG. 5 is performed on a limited-access road during the vehicle speed control of the host vehicle. For example, the processing, which is performed by the ECU 10, is started at the same time the vehicle speed control is started and is terminated at the same time the vehicle speed control is terminated.

First, in S50, the vehicle speed control device 1a determines whether the preceding-vehicle-following vehicle speed control is being performed. For example, based on whether the host vehicle is currently in the preceding-vehicle-following vehicle speed control state, the vehicle speed control unit 18 determines whether the preceding-vehicle-following vehicle speed control is being performed. Instead, in step S50, whether the preceding-vehicle-following vehicle speed control is being performed may be determined also by determining whether the preceding vehicle detection unit 14 has detected a preceding vehicle traveling ahead of the host vehicle.

If it is determined in S50 that preceding-vehicle-following vehicle speed control is being performed, the series of the information processing shown in FIG. 5 is terminated. In this case, because preceding-vehicle-following vehicle speed control is being performed for the host vehicle, the acceleration-control-inhibited control is not performed and, therefore, the information processing is not necessary.

On the other hand, if it is determined in step S50 that the preceding-vehicle-following vehicle speed control is not being performed, the vehicle speed control device 1a determines whether the host vehicle has moved from an exit-lane branching section to an exit lane (S52). For example, based on the host vehicle position detected by the vehicle position recognition unit 12, the entrance determination unit 17 determines whether the host vehicle has moved from an exit-lane branching section of the limited-access road to an exit lane.

If it is not determined in S52 that the host vehicle has moved from the exit-lane branching section to the exit lane, the series of the information processing shown in FIG. 5 is terminated. That is, in this case, the information processing is not performed by the information unit 19, but the series of the information processing shown in FIG. 5 is terminated. In addition, if it is not determined that the host vehicle has moved to the exit lane and if the host vehicle has already moved out of the exit-lane branching section, the series of the information processing shown in FIG. 5 may be terminated, assuming that the host vehicle is not determined to have moved to the exit lane. On the other hand, if it is determined in S52 that the host vehicle has moved from the exit-lane branching section to the exit lane, the information processing is performed (S54). The information processing refers to the processing for informing the driver of the host vehicle that the acceleration-control-inhibition vehicle speed control is being performed. The information processing is performed by sending the control signal from the information unit 19 to the HMI 9 cause it to operate. For example, the information processing is performed by displaying letters or marks, which indicate that the acceleration-control-inhibition vehicle speed control is being performed, on the display, monitor, or indicator of the HMI 9. The information processing may also be performed by causing the speaker or the buzzer of the HMI 9 to output sounds or voices indicating that the acceleration-control-inhibition vehicle speed control is being performed. The information processing may also be performed by causing the vibrator of the HMI 9 to output vibrations indicating that the acceleration-control-inhibition vehicle speed control is being performed. After the information processing in S54 is finished, the series of the information processing shown in FIG. 5 is terminated. After that, the processing is repeated again beginning in S50.

Figure 6:
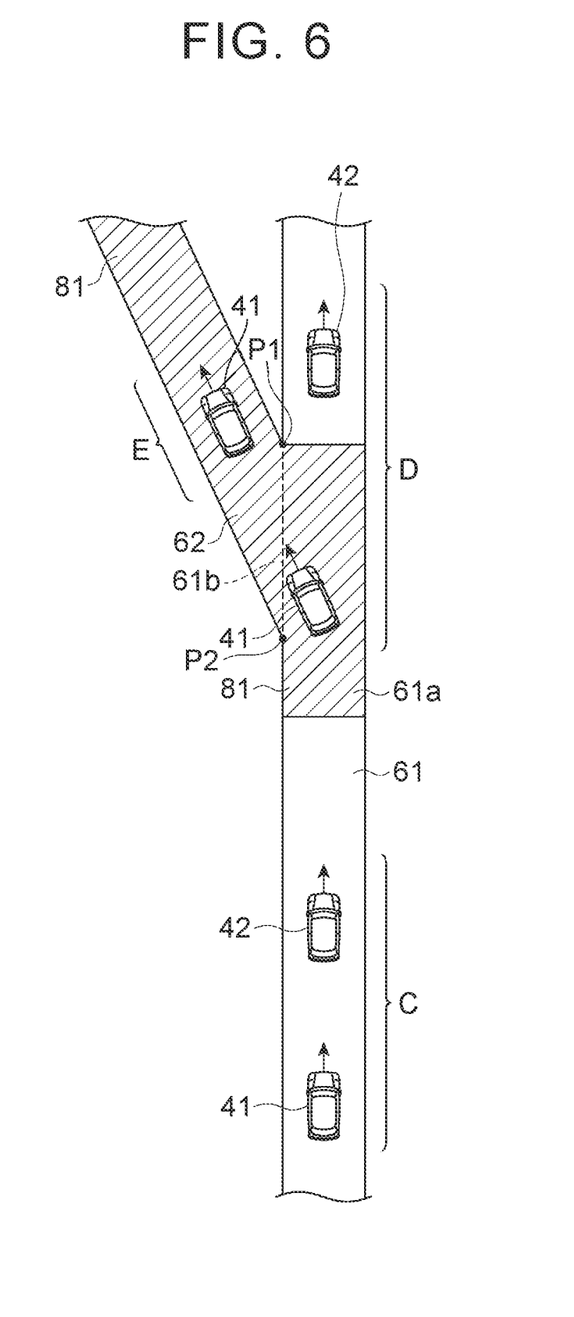
FIG. 6 is a diagram showing vehicle speed control and information control in an expressway performed by the vehicle speed control device shown in FIG. 4.

FIG. 6 is a diagram showing the vehicle speed control and the information control performed by the vehicle speed control device 1a in this embodiment.

As shown in scene C in FIG. 6, the host vehicle 41 is traveling behind the preceding vehicle 42 in the main lane 61 on an expressway that is corresponding to a limited-access road. Therefore, the vehicle speed control device 1a (not shown in FIG. 6), mounted on the host vehicle 41, is performing the preceding-vehicle-following vehicle speed control for following the preceding vehicle 42. In the expressway shown in FIG. 6, the exit lane 62 that branches off the main lane 61 is the acceleration-control-inhibited area 81. In addition, in this embodiment, the area that is a part of the main lane 61 and is adjacent to the exit lane 62 is an exit-lane branching section 61a that is also the acceleration-control-inhibited area 81. That is, in the vehicle speed control device 1a, both the exit lane 62 and the exit-lane branching section 61a are set as the acceleration-control-inhibited area 81. The exit-lane branching section 61a is separated from the exit lane 62 by a boundary 61b that is extended along the edge of the main lane 61. The boundary 61b is marked on the road, for example, as a white broken line. The exit-lane branching section 61a, which includes the boundary 61b, is set on the main lane 61. For example, the exit-lane branching section 61a is set between the start position P1 of the boundary 61b and the position a predetermined distance down from the end position P2 of the boundary 61b.

After that, the scene changes to scene D where the host vehicle 41 has entered the exit-lane branching section 61a. In this case, when the vehicle speed control device 1a cannot detect the preceding vehicle 42 in the exit-lane branching section 61a, the acceleration-control-inhibition vehicle speed control is performed. That is, when the host vehicle 41 is going to enter the exit lane 62, the acceleration-control-inhibition vehicle speed control is performed before the host vehicle 41 enters the exit lane 62. This vehicle speed control can avoid an unnecessary acceleration of the host vehicle 41 immediately before the host vehicle 41 enters the exit lane 62. That is, if the exit-lane branching section 61a is not the acceleration-control-inhibited area 81, there is a possibility that the acceleration control is performed for the host vehicle 41 until the host vehicle 41 enters the exit lane 62, because the preceding vehicle 42 disappears from the road ahead of the host vehicle 41 while the host vehicle 41 is moving from the main lane 61 to the exit lane 62. This acceleration control is performed to accelerate the host vehicle 41 to the preset speed. On the other hand, the vehicle speed control device 1a in this embodiment can avoid such an unnecessary acceleration control because the exit-lane branching section 61a immediately before the exit lane 62 is set as the acceleration-control-inhibited area 81. Therefore, the vehicle speed control device 1a can reduce the possibility that the driver feels a sense of strangeness for the traveling control of the host vehicle 41.

In addition, when the host vehicle 41 has entered the exit lane 62 as shown in scene E, the information unit 19 informs the driver that the acceleration-control-inhibition vehicle speed control is being performed. For example, the information processing is performed by displaying the information on the display or outputting sounds from the speaker. This information processing allows the driver to know that the acceleration control is not performed even if there is no preceding vehicle 42. In addition, the information processing is performed after the host vehicle 41 enters the exit lane 62, meaning that the information processing is not performed if the host vehicle 41 continues traveling in the main lane 61 without entering the exit lane 62. Therefore, if the host vehicle 41 does not enter the exit lane 62 but continues traveling in the main lane 61, this information method avoids the situation in which the information is output each time the host vehicle 41 passes through the exit-lane branching section 61a, thus reducing the possibility that the driver feels that the information is cumbersome. In addition, if there is little or no change in the vehicle speed when the host vehicle 41 passes through the exit-lane branching section 61a while traveling in the main lane 61, this information method can prevent the driver from having a sense of distrust about the information indicating that the acceleration-control-inhibition vehicle speed control is being performed.

As described above, if the preceding vehicle 42 is not detected and the host vehicle 41 is positioned in the acceleration-control-inhibited area 81 during the vehicle speed control for the host vehicle, the vehicle speed control device 1a in this embodiment performs the acceleration-control-inhibition vehicle speed control of the host vehicle 41 in the same manner as the vehicle speed control device 1 in the first embodiment. This vehicle speed control can avoid an unnecessary acceleration in the traveling of the host vehicle 41, thus reducing the possibility that the driver feels a sense of strangeness due to the unnecessary acceleration.

In addition, the vehicle speed control device 1a in this embodiment sets the acceleration-control-inhibited area 81 not only in the exit lane 62 but also in the exit-lane branching section 61a. Setting the acceleration-control-inhibited area 81 in this way can avoid an unnecessary acceleration control at a position immediately before the exit lane 62 if the host vehicle 41 does not follow the preceding vehicle 42 anymore.

The vehicle speed control device 1a in this embodiment informs the driver that the acceleration-control-inhibition vehicle speed control is being performed when the host vehicle 41 enters the exit lane 62. Therefore, even if the host vehicle 41 is not accelerated in a situation in which the host vehicle 41 should be accelerated, the vehicle speed control device 1a reduces the possibility that the driver has a feeling of strangeness about the traveling of the host vehicle. In addition, the information is sent to the driver after the host vehicle 41 has entered the exit lane 62. This means that the information is not sent if the host vehicle 41 has entered the exit-lane branching section 61a of a limited-access road but if it is not determined that the host vehicle 41 has moved from the exit-lane branching section 61a to the exit lane 62. This information method reduces the possibility that the driver feels that the information is cumbersome. In addition, when the host vehicle 41 continues traveling straight ahead in the main lane of a limited-access road, this information method can prevent the driver from having a sense of distrust about the information indicating that the acceleration-control-inhibition vehicle speed control is being performed.

The above described embodiments describe a part of the embodiments of the vehicle speed control device of the present invention and, therefore, it is to be understood that the vehicle speed control device of the present invention is not limited to those described in the above-described embodiments. The vehicle speed control device of the present invention may be the one that is created by modifying the vehicle speed control device in the above-described embodiments, or may be the one applied to other units, within the spirit of the present invention described in claims.

What is claimed is:

1. A vehicle speed control device that performs vehicle speed control for controlling a speed of a host vehicle in accordance with a preset vehicle speed that is set in advance when a preceding vehicle traveling ahead of the host vehicle is not detected and for controlling the vehicle speed of the host vehicle so that the host vehicle follows the preceding vehicle when the preceding vehicle is detected, and wherein the vehicle speed control device is configured to:
store information identifying an acceleration-control-inhibited area that is set on a map in advance,
wherein the acceleration-control-inhibited area includes an exit-lane branching section of a limited-access road and an exit lane branching off the exit-lane branching section of the limited-access road,
wherein a boundary between the limited-access road and the exit lane is formed parallel to the limited-access road, and
wherein the exit-lane branching section includes a portion of the limited-access road that extends from a start position of the boundary to an end position of the boundary that is apart, by a predetermined distance, from the start position in a direction that is opposite to a travelling direction of the limited-access road;
detect a position of the host vehicle on the map;
determine that the host vehicle is positioned in the acceleration-control-inhibited area based on the position of the host vehicle on the map;
perform acceleration-control-inhibition vehicle speed control of the host vehicle when the preceding vehicle is not detected and when the vehicle speed control device determines that the host vehicle is positioned in the acceleration-control-inhibited area;
determine, based on performing the acceleration-control-inhibition vehicle speed control of the host vehicle, whether the host vehicle has moved from the exit-lane branching section of the limited-access road to the exit lane based on the position of the host vehicle on the map; and
selectively output information to inform a driver of the host vehicle that the acceleration-control-inhibition vehicle speed control of the host vehicle is being performed based on determining whether the host vehicle has moved from the exit-lane branching section of the limited-access road to the exit lane,
wherein the vehicle speed control device outputs the information to inform the driver of the host vehicle that the acceleration-control-inhibition vehicle speed control of the host vehicle is being performed when the vehicle speed control device determines that the host vehicle has moved from the exit-lane branching section of the limited-access road to the exit lane, and wherein the vehicle speed control device does not output the information to inform the driver of the host vehicle that the acceleration-control-inhibition vehicle speed control of the host vehicle is being performed when the vehicle speed control does not determine that the host vehicle has moved from the exit-lane branching section of the limited-access road to the exit lane.

2. The vehicle speed control device according to claim 1, wherein
the preceding vehicle is a vehicle that travels ahead of the host vehicle in the same lane in which the host vehicle travels.

3. The vehicle speed control device according to claim 1, wherein a function to perform acceleration control according to a blinker operation is provided as the vehicle speed control for the host vehicle.

4. The vehicle speed control device according to claim 1, wherein the vehicle speed control device is further configured to:
determine whether the speed of the host vehicle is lower than the preset vehicle speed when it is determined that the preceding vehicle is not detected,
determine whether the host vehicle is positioned in the acceleration-control-inhibited area when it is determined that the speed of the host vehicle is lower than the preset vehicle speed, and
perform the acceleration-control-inhibition vehicle speed control of the host vehicle when it is determined that the speed of the host vehicle is not lower than the preset vehicle speed.

* * * * *